US012665699B1

(12) United States Patent
Smalley et al.

(10) Patent No.: US 12,665,699 B1
(45) Date of Patent: Jun. 23, 2026

(54) CLOUD-BASED REAL-TIME MESSAGING LAYER FOR RESOURCE TRANSMISSION

(71) Applicant: Citibank, N.A., New York, NY (US)

(72) Inventors: Matthew Smalley, Gravesend (GB);
Charles C. Tsai, Jersey City, NJ (US);
Keshava Kottapally, Hillsborough, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/555,539

(22) Filed: Mar. 3, 2026

(51) Int. Cl.
H04L 1/00 (2006.01)

(52) U.S. Cl.
CPC ................................. H04L 1/0047 (2013.01)

(58) Field of Classification Search
CPC .................................................. H04L 1/0047
See application file for complete search history.

(56) References Cited

U.S. PATENT DOCUMENTS

| | | | | |
|---|---|---|---|---|
| 12,474,964 | B1 * | 11/2025 | Abhyankar ........... | G06F 9/5033 |
| 2014/0188725 | A1 * | 7/2014 | Reardon ................ | G06Q 20/40 |
| | | | | 705/44 |
| 2014/0297866 | A1 * | 10/2014 | Ennaji ................. | G06F 9/45533 |
| | | | | 709/226 |
| 2019/0132709 | A1 * | 5/2019 | Graefe .................... | H04W 4/06 |
| 2021/0029729 | A1 * | 1/2021 | Abedini ................ | H04W 88/14 |
| 2021/0168662 | A1 * | 6/2021 | Dowlatkhah ......... | H04W 76/10 |
| 2021/0211241 | A1 * | 7/2021 | Xiong ................... | H04L 1/1819 |

| | | | | |
|---|---|---|---|---|
| 2021/0212061 | A1 * | 7/2021 | Yang ................... | H04W 72/535 |
| 2022/0014963 | A1 * | 1/2022 | Yeh .................... | H04W 28/0268 |
| 2022/0182171 | A1 * | 6/2022 | Sakhnini ............... | H04L 1/0061 |
| 2023/0079744 | A1 * | 3/2023 | Cavatassi ............. | G06N 3/0442 |
| | | | | 706/21 |
| 2023/0300795 | A1 * | 9/2023 | Zhang ................... | H04L 5/0094 |
| | | | | 455/458 |
| 2023/0387971 | A1 * | 11/2023 | Lin ........................ | H04L 5/0094 |
| 2024/0089035 | A1 * | 3/2024 | Bar-Or Tillinger ......................... | |
| | | | | H04W 72/535 |
| 2024/0121657 | A1 * | 4/2024 | Zhang ................. | H04W 12/037 |
| 2024/0250869 | A1 * | 7/2024 | Krawczyk ........... | H04L 41/0803 |
| 2024/0267113 | A1 * | 8/2024 | Dees ..................... | H04W 88/06 |

(Continued)

FOREIGN PATENT DOCUMENTS

| | | | | | |
|---|---|---|---|---|---|
| CN | 101480071 | A | * | 7/2009 | .............. H04W 4/12 |
| CN | 106797635 | A | * | 5/2017 | ............ H04W 76/14 |

(Continued)

*Primary Examiner* — Sujoy K Kundu
*Assistant Examiner* — Vladislav Y Agureyev
(74) *Attorney, Agent, or Firm* — Perkins Coie LLP

(57) ABSTRACT

Methods and systems for cloud-based resource transmission are disclosed. A system may receive a resource allocation message from a computing device in a source encoding. The message may be transformed into a destination encoding using a transformation map to generate an encoded message. The encoded message may be transmitted to a message processing system. An error message with an error code may be received in response. The system may determine which message caused the error based on the error code. It may be determined that the first computing device caused the error. An indication of the error code may be transmitted to the first computing device. This approach may enable efficient handling and error resolution for resource allocation messages across multiple encodings and devices.

20 Claims, 7 Drawing Sheets

(56)        References Cited

U.S. PATENT DOCUMENTS

2024/0267152 A1 *   8/2024   Bin Sediq ............. H04L 1/0021
2025/0267748 A1 *   8/2025   Gummadi ............. H04W 48/08
2025/0310186 A1 *  10/2025   Kim .................... H04L 41/0806
2026/0032491 A1 *   1/2026   Li ......................... H04W 24/10

FOREIGN PATENT DOCUMENTS

CN          110268786  B   *   5/2023   ........ H04W 72/0446
CN          117651142  A   *   3/2024   ....... H04N 21/85406
CN          121418390  A   *   1/2026
EP            3506545  A1  *   7/2019   ............ H04W 72/23
EP            4178157  A1  *   5/2023   ............ H04L 69/324
EP            3888402  B1  *   6/2025   ............ H04W 72/51
WO    WO-2024253782  A1  *  12/2024   ............ G06F 30/27
WO    WO-2025110278  A1  *   5/2025   ............... H04L 1/00
WO    WO-2025128159  A1  *   6/2025   ............ G06N 10/00
WO    WO-2025218887  A1  *  10/2025   ............ H04L 1/1812
WO    WO-2025253106  A1  *  12/2025   ............ H04L 67/565
WO    WO-2025255392  A1  *  12/2025   ............ H01Q 1/2291
WO    WO-2026049076  A1  *   3/2026   ............... H04L 1/00
WO    WO-2026061901  A1  *   3/2026   ............ G01S 7/0235

* cited by examiner

100

200

| Message ID | TimeStamp | Source Device | Message Type |
|---|---|---|---|
| | 203 | 206 | 209 | 212 |
| 12 | 2023-09-25 18:45:30 | <Data_1> | <Data_2> |
| 13 | 2023-09-25 19:41:33 | <Data_1> | <Data_2> |
| 14 | 2023-09-25 21:31:13 | <Data_1> | <Data_2> |

| Map ID | Map Params | Transformation Data |
|--------|------------|---------------------|
| 121 | <Params_1> | <Data_1> |
| 122 | <Params_2> | <Data_2> |
| 124 | <Params_3> | <Data_3> |

| State Entry ID | State Param_1 | State Param_2 |
|---|---|---|
| 1 | Param1_Values_1 | Param2_Values_1 |
| 2 | Param1_Values_2 | Param2_Values_2 |
| 3 | Param1_Values_3 | Param2_Values_3 |

| Error Code ID | Message ID | Error Data |
|---|---|---|
| 503 | 506 | 509 |
| 1 | abcdeefg13 | <Data_1> |
| 2 | abadfeefg11 | <Data_2> |
| 3 | abcadfg01 | <Data_3> |

CLOUD-BASED REAL-TIME MESSAGING LAYER FOR RESOURCE TRANSMISSION

BACKGROUND

With the advent of cloud computing, resource generation and allocation have become increasingly important. Cloud computing systems may include a large number of computing devices that have various combinations of memory, processors, disk space, etc. Those resources may be pre-allocated or allocated on-demand to hosted applications or tasks being performed in the cloud. Although cloud computing systems have vast resources to be allocated, those resources are still limited because of a large number of applications that now reside in the cloud. Accordingly, systems of assigning those resources to various tasks and applications have become more and more complex. In many instances the assigned resources are not enough to efficiently execute an application or a workload. Resource management platforms have been steadily moving into the cloud to take advantage of processing power and flexibility cloud systems provide.

Resource management platforms rely on complex systems to process large volumes of transactions and manage vast amounts of data. These systems often involve multiple components that need to communicate and exchange information in real-time. As the scale and complexity of resource operations grow, traditional architectures may struggle to handle the increased load and diverse data formats efficiently. Integrating various software systems and data sources can present challenges, especially when dealing with legacy systems or third-party applications that use different data formats and communication protocols. This heterogeneity can lead to inefficiencies, increased latency, and potential errors in data translation and processing. Additionally, these systems require robust error handling and data consistency mechanisms to ensure the accuracy and reliability of transactions and reporting. Implementing these features across a distributed architecture while maintaining performance and scalability can be technically demanding.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A resource transmission system is disclosed herein that facilitates transformation of resource allocation messages into proper encoding for ingestion by a message processing system. The resource transmission system may receive resource allocation messages from multiple computing devices, with each message containing parameters associated with a set of resources. The system may then determine a transformation map for each message based on the sending device and message type. The system then transforms each message from its source encoding to a destination encoding using the appropriate transformation map. The encoded messages are then transmitted to a message processing system that generates records from those messages. When a new resource allocation message is received, the system transforms and transmits the new resource allocation message to the message processing system. If an error occurs, the resource transmission system may receive an error message, determine which original message caused the error, identify the responsible computing device, and notify (e.g., an operator or a computing device) of the error. The system may receive an updated message to fix the error, transform and transmit the updated message to the message processing system. The resource transmission system may then generate a resource state based on acknowledgments from the message processing system.

The resource transmission system may receive multiple messages from different computing devices about allocating resources. Specifically, the resource transmission system may receive a plurality of resource allocation messages from a plurality of computing devices. Each resource allocation message of the plurality of resource allocation messages may include a corresponding plurality of parameters associated with a corresponding set of resources. For example, the system may receive messages from various systems about allocating different resources and different resource types, with each message containing details like resource quantity, resource locations, and account information.

The resource transmission system may determine how to transform each message based on where it came from and what type of message it is. Specifically, the resource transmission system may determine, based on a corresponding computing device of the plurality of computing devices and a corresponding message type of each message of the plurality of resource allocation messages retrieved from the corresponding plurality of parameters, a corresponding transformation map of a plurality of transformation maps for transforming each message of the plurality of resource allocation messages. For example, the system may identify that a message came from a particular trading platform and is an application programming interface (API) call, then select the appropriate transformation rules/map for that combination.

The resource transmission system may convert each message from its original encoding into a standard encoding (e.g., standard for the message processing system) that may be processed by that system. Specifically, the resource transmission system may transform, using the plurality of transformation maps, each message from a corresponding source encoding of a plurality of source encodings into a corresponding destination encoding of a plurality of destination encodings to generate a plurality of encoded messages. For example, the system may take a message in a particular XML encoding/format and convert the message into a JSON encoding/format expected by the message processing system.

The resource transmission system may then send the converted messages to another system that processes them (e.g., the message processing system). Specifically, the resource transmission system may transmit the plurality of encoded messages to a message processing system. The message processing system may process the plurality of encoded messages to generate a plurality of records. For example, the system may send standardized JSON messages to the message processing system that creates resource processing records from them.

The resource transmission system may receive a new message after sending the initial batch. Specifically, the resource transmission system may, subsequently to transmitting the plurality of encoded messages, receive, from a first computing device of the plurality of computing devices, a new resource allocation message in a source encoding of the plurality of source encodings. For example, the system may receive a new allocation message from a particular platform in that platform's native encoding.

The resource transmission system may convert the new message to the standard format (supported by the message processing system). Specifically, the resource transmission system may transform, using a first transformation map of the plurality of transformation maps, the new resource allocation message into a destination encoding of the plurality of destination encodings to generate an encoded resource allocation message. For example, the system may apply the transformation rules for that platform to convert the message to the standard JSON encoding.

The resource transmission system may then send the converted new message for processing. Specifically, the resource transmission system may transmit the encoded resource allocation message to the message processing system. For example, the system may send the newly converted JSON message to the central clearing system.

The resource transmission system may then receive an error message if there's a problem with the new message or a combination of older messages and a new message. Specifically, the resource transmission system may receive, from the message processing system in response to the encoded resource allocation message, an error message generated based on the encoded resource allocation message, wherein the error message comprises an error code. For example, the system may receive a message indicating that an action couldn't be processed due to one or more conditions. The response may include an associated error code.

The resource transmission system may determine which original message or combination of messages caused the error. Specifically, the resource transmission system may determine, based on the error code, a message of the plurality of resource allocation messages associated with the error code. For example, the system may use the error code to trace back to the specific trade allocation message that triggered the error.

The resource transmission system may identify which computing device sent the problematic message. Specifically, the resource transmission system may determine, based on the message of the plurality of resource allocation messages and the error code, that the first computing device has caused an error associated with the error code. For example, the system may determine that the error was caused by a message from a particular trading platform.

The resource transmission system may notify the responsible device about the error. Specifically, the resource transmission system may transmit an indication of the error code to the first computing device. For example, the system may send a notification to the trading platform that submitted the problematic trade, including details about the error.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), of a given item (e.g., data), unless the context clearly dictates otherwise.

BRIEF DESCRIPTION OF FIGURES

FIG. 2 depicts an excerpt of a data table containing message records, in accordance with example embodiments.

FIG. 3 illustrates a transformation map data structure for storing transformation mapping information, according to an embodiment.

FIG. 4 depicts a state table for storing state information, according to aspects of the present disclosure.

FIG. 5 illustrates an error tracking table for storing error information, in accordance with example embodiments.

DETAILED DESCRIPTION

Figure 1:
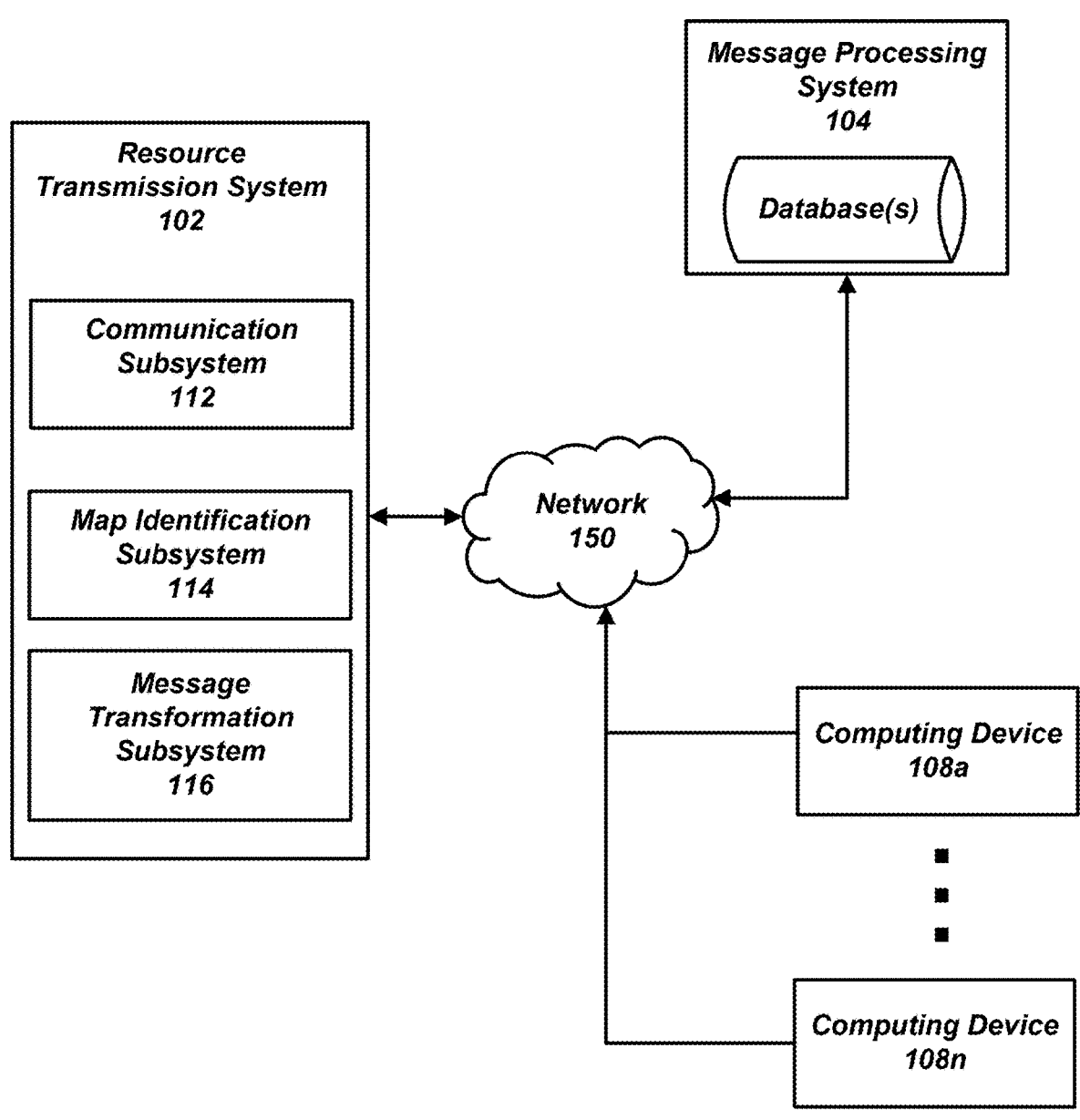
FIG. 1 illustrates a block diagram of a resource transmission environment, according to aspects of the present disclosure.

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a system/process to transform and transmit resource allocation messages across diverse financial platforms in view of the available conventional approaches created significant technological uncertainty. Creating such platform/system/process required addressing several unknowns in conventional approaches in message transformation and routing, such as handling multiple source encodings, destination encodings, and dynamic error handling. Similarly, conventional approaches in financial data processing did not adequately address the uncertainty presented by real-time transformation of heterogeneous message formats across different trading systems.

Conventional approaches rely on static message transformation rules and predefined routing paths, which do not adapt to the dynamic nature of financial transactions. For example, a conventional system may use fixed XML schemas for all incoming messages and fail to handle proprietary or evolving message formats. Conventional approaches typically involve batch processing of financial data, which cannot provide the real-time responsiveness required in modern trading environments. Conversely, the disclosed system employs dynamic transformation maps and adaptive routing based on message types and sources, enabling real-time processing of diverse financial messages.

Additionally, integrating legacy financial systems with modern cloud-based platforms created further technological uncertainty, since the legacy systems often use outdated communication protocols and data formats. Legacy financial transaction processing systems often lack the flexibility to handle new financial instruments or complex trading strategies. To successfully integrate legacy systems while maintaining data integrity and transaction accuracy, factors such as data consistency, transaction atomicity, and backward compatibility must be taken into consideration.

To overcome the technological uncertainties, the inventors systematically evaluated multiple design alternatives. For example, the inventors experimented with various message transformation techniques, including XSLT, JSON-LD, and custom parsing algorithms. The inventors also explored different error handling and recovery mechanisms, such as compensating transactions and message replay, which allowed the inventors to develop a robust system capable of maintaining data consistency even in the face of network failures or processing errors.

The use of a centralized message transformation hub proved to be problematic as it created a single point of failure and scalability bottleneck, as it failed to efficiently handle the high volume and variety of financial messages, leading to increased latency and potential data loss. Similarly, attempting to standardize all incoming messages to a single format did not account for the diverse requirements of different financial instruments and regulatory reporting needs. Further, relying solely on cloud-based processing ignored the potential benefits of edge computing for low-latency trading operations, creating uncertainty around meeting strict timing requirements for certain types of financial transactions.

Thus, the inventors experimented with different methods for distributed message transformation and routing. For example, the inventors tested various load balancing algorithms, message prioritization schemes, and parallel processing techniques to identify the most efficient and effective approaches. Additionally, the inventors systematically evaluated different strategies for error detection and recovery in a distributed environment. The inventors evaluated, for example, different methods of maintaining consistency across distributed nodes, such as implementing distributed consensus algorithms, exploring eventual consistency models, and developing custom synchronization protocols tailored to financial data requirements.

FIG. 1 is an example of environment 100 for transforming and transmitting resource allocation messages to a message processing system. Environment 100 includes resource transmission system 102, message processing system 104, and computing devices 108a-108n. Resource transmission system 102 may execute instructions for transforming and transmitting resource allocation messages to message processing system 104. Resource transmission system 102 may include software, hardware, or a combination of the two. For example, resource transmission system 102 may be hosted on a physical server or a virtual server that is running on a physical computer system. In some embodiments, resource transmission system 102 may be configured on a user device (e.g., a laptop computer, a smartphone, a desktop computer, an electronic tablet, or another suitable user device) or on a cloud computing platform. Resource transmission system 102 may be connected to message processing system 102, computing devices 108a-108n, and other suitable devices via network 150. Network 150 may be a local area network, a wide area network (e.g., the Internet) or a combination of both.

The resource transmission system may facilitate the transfer and processing of resource allocation messages within a computing environment. This system may serve as an intermediary between various computing devices and a message processing system, enabling efficient communication and data transformation. The resource transmission system may handle incoming messages from multiple sources, transform them into a standardized format, and forward them to the message processing system for further processing and analysis.

In some cases, the resource transmission system may include one or more processors and one or more memories. These components may work together to execute the various functions of the system, such as receiving messages, determining appropriate transformation maps, and transmitting encoded messages. The processors may perform the computational tasks required for message transformation and routing, while the memories may store the necessary data structures, transformation maps, and temporary message information.

Resource transmission system 102 may receive multiple messages related to resource allocation from various computing devices. Specifically, resource transmission system 102 may receive a plurality of resource allocation messages from a plurality of computing devices. Each resource allocation message of the plurality of resource allocation messages may include a corresponding plurality of parameters associated with a corresponding set of resources. For example, the resource transmission system 102 may implement a message queue or another suitable system to collect incoming messages from different devices, parse each message to extract the relevant parameters, and store the extracted data in a temporary buffer or another data structure for further processing. In some embodiments, resource transmission system 102 may publish one or more application programming interfaces (APIs) to enable receipt of the resource allocation messages. A source device may call a corresponding API with proper parameters to transmit the resource allocation message.

FIG. 2 illustrates an excerpt of data structure 200, which is designed to efficiently store resource allocation messages. At its core, the structure includes several fields to process and store incoming data. Message identifier 203 may serve as a unique key for each resource allocation message received by the system. This identifier may be automatically generated and assigned to incoming messages, allowing for efficient tracking and retrieval of specific messages within the data structure. The message identifier may be used to link related messages or to reference a particular message during error handling or state management processes. Timestamp 206 may record the exact date and time when a resource allocation message is received or processed by the system. This temporal information may be crucial for maintaining message order, tracking processing delays, and ensuring that resource allocations are handled in a timely manner. The timestamp may also be used in conjunction with the message identifier to create a chronological record of all incoming messages, which may be valuable for auditing and analysis purposes.

Field 209 and field 212 may represent the source device and message type respectively, may provide essential context for each resource allocation message. The source device information may indicate which computing device or platform originated the message, potentially influencing how the message is processed or transformed. The message type may categorize the nature of the resource allocation request, such as distinguishing between different financial instruments or allocation strategies. Together, these elements may enable the system to apply appropriate transformation maps and processing rules based on the specific characteristics of each incoming message.

In some implementations, a resource allocation message may represent an instruction to assign or distribute financial instruments during trading operations. Such a message may include parameters specifying the type and quantity of financial instruments to be allocated, identifiers for the involved accounts or trading entities, and relevant execution details such as timing constraints or price thresholds. For example, a resource allocation message may direct the system to allocate a specified number of futures contracts to a particular trading account, transfer a block of bonds between counterparties, or distribute newly issued securities to a group of investors. The resource transmission system may process these financial instrument allocation messages to ensure proper routing, validation, and transformation before forwarding them to the appropriate components of the trading and settlement infrastructure.

Resource transmission system 102 may handle various types of messages related to financial operations. Trade-related messages may include communications pertaining to the execution, confirmation, and settlement of financial transactions. These messages may contain details such as security identifiers, quantities, prices, and timestamps for order placements, trade confirmations, and execution reports. In some cases, trade-related messages may be used to track the lifecycle of a trade from initial order to final settlement, enabling accurate record-keeping and timely processing of market activities.

Commission-related messages may involve information about fees charged by brokers or other intermediaries for facilitating trades or providing financial services. These messages may include commission rates, calculation methods, and allocation details for different types of transactions or accounts. For example, a commission-related message may specify the commission structure for a particular trading strategy or client relationship. The system may use these messages to accurately calculate and distribute commission amounts across various parties involved in financial transactions.

Fee-related messages may encompass communications about charges associated with account maintenance, transaction processing, or other financial services. These messages may contain fee schedules, billing periods, and payment instructions for different types of fees. In some implementations, fee-related messages may be used to automate the assessment and collection of fees from client accounts or to generate invoices for financial services rendered. The system may process these messages to ensure proper fee application and maintain transparency in financial operations.

Collateral transaction messages may pertain to the management of assets pledged as security for financial obligations. These messages may include information about collateral valuation, margin requirements, and collateral transfers between parties. For instance, a collateral transaction message may specify the type and amount of collateral being posted for a derivatives contract. The system may use these messages to monitor collateral positions, calculate margin requirements, and facilitate the movement of collateral assets between accounts or custodians.

Cash posting messages may relate to the movement of funds within or between accounts. These messages may contain details such as transaction amounts, account identifiers, and settlement dates for cash transfers. In some cases, cash posting messages may be used to process deposits, withdrawals, or inter-account transfers as part of broader financial operations. The system may handle these messages to ensure accurate and timely movement of cash, maintain proper account balances, and support liquidity management across various financial instruments and activities.

Throughout these processes, the back-office system may generate confirmation messages, produce reports, and maintain audit trails to ensure accurate record-keeping and regulatory compliance.

Resource transmission system 102 may analyze the received messages to determine how to transform them. Specifically, resource transmission system 102 may determine, based on a corresponding computing device of the plurality of computing devices and a corresponding message type of each message of the plurality of resource allocation messages retrieved from the corresponding plurality of parameters, a corresponding transformation map of a plurality of transformation maps for transforming each message of the plurality of resource allocation messages. For example, resource transmission system 102 may maintain a lookup table that maps device identifiers and message types to specific transformation rules/maps, query this table for each received message, and select the appropriate transformation map based on the query results. For example, a transformation map may indicate that an Extensible Markup Language (XML) file with a particular set of parameters is to be transformed to a JavaScript Object Notation (JSON) file with those parameters.

Resource transmission system 102 may convert the messages from their original format to a format supported by the message processing system. Specifically, resource transmission system 102 may transform, using the plurality of transformation maps, each message from a corresponding source encoding of a plurality of source encodings into a corresponding destination encoding of a plurality of destination encodings to generate a plurality of encoded messages. For example, resource transmission system 102 may apply a series of data transformation functions defined in each transformation map to convert the message fields from their source format to the required destination format, potentially involving data type conversions, field renaming, or structural reorganization.

Resource transmission system 102 may send the converted messages to another system for processing. Specifically, the resource transmission system 102 may transmit the plurality of encoded messages to a message processing system. The message processing system may process the plurality of encoded messages to generate a plurality of records. For example, the resource transmission system 102 may establish a secure network connection with the message processing system, package the encoded messages into a standardized transport format, and transmit them in batches to optimize network usage and processing efficiency. In some embodiments, resource transmission system 102 may call APIs published by the message processing system to transmit the encoded messages.

In some embodiments, resource transmission system 102 may transmit the messages to a back-office processing and clearing system for exchange-trade derivatives. The back-office processing and clearing system for exchange-traded derivatives may process the various types of messages described herein in several ways. For trade-related messages, the system may validate the transaction details, match the buy and sell sides, and update position records accordingly. When processing commission-related messages, the system may apply the specified commission rates to relevant transactions, calculate the appropriate fees, and allocate them to the designated accounts or entities. For fee-related messages, the system may implement the fee schedules, assess charges to the appropriate accounts, and generate invoices or statements as needed. In handling collateral transaction messages, the system may update collateral positions, recalculate margin requirements based on the new information, and initiate any necessary collateral transfers between accounts. For cash posting messages, the system may execute the specified fund transfers, update account balances, and reconcile the movements with other financial activities.

Resource transmission system 102 may handle new incoming messages after sending the initial batch. Specifically, after transmitting the plurality of encoded messages, the resource transmission system 102 may receive, from a first computing device of the plurality of computing devices, a new resource allocation message in a source encoding of the plurality of source encodings. For example, the resource transmission system 102 may maintain an active listening socket for incoming messages, detect a new message arrival from the first computing device, and place it in a processing queue for immediate handling.

Resource transmission system 102 may convert the new message to a format supported by the message processing system. Specifically, resource transmission system 102 may transform, using a first transformation map of the plurality of transformation maps, the new resource allocation message into a destination encoding of the plurality of destination encodings to generate an encoded resource allocation message. For example, resource transmission system 102 may identify the appropriate transformation map based on the message source and type, apply the defined transformation rules to convert the message fields, and validate the resulting encoded message against a schema for the destination format.

Resource transmission system 102 may send the newly converted message for processing. Specifically, the resource transmission system 102 may transmit the encoded resource allocation message to the message processing system. For example, resource transmission system 102 may package the encoded message in a transport envelope, add any necessary metadata or headers, and send it to the message processing system using an established network protocol.

A processing and clearing system for exchange-traded derivatives may handle received messages through a multi-stage workflow. The system may receive various types of messages, including trade orders, cancellations, modifications, and settlement instructions. Upon receipt, messages may undergo initial processing steps such as format validation, authentication of the sender, and integrity checks. The system may then prioritize messages based on factors such as message type, timestamp, and market conditions, placing them in appropriate queues for further processing. Real-time processing may occur for certain message types, such as matching engine components rapidly pairing buy and sell orders. The system may integrate with clearing processes by routing matching trades to a clearing module, which may perform risk calculations, margin requirement updates, and position management. Post-trade processing may include functions such as trade confirmation generation, regulatory reporting, and end-of-day reconciliation. Throughout this workflow, the system may employ components such as message parsers, validation engines, matching algorithms, risk management modules, and data storage systems to efficiently process and clear derivative transactions.

Resource transmission system 102 may receive feedback about issues with the processed message. Specifically, resource transmission system 102 may receive, from the message processing system in response to the encoded resource allocation message, an error message generated based on the encoded resource allocation message. The error message may include an error code. For example, resource transmission system 102 may implement an error handling callback function that receives error notifications from the message processing system, parses the received error message to extract the error code and any additional error details, and logs this information for further analysis.

A processing and clearing system for exchange-traded derivatives may implement multi-layered error handling mechanisms for various data types. For trade data, the system may employ automated validation checks to identify discrepancies in order details, pricing, or counterparty information, flagging potential errors for immediate review. In handling collateral data, the system may utilize real-time reconciliation processes to detect mismatches between posted collateral and margin requirements, triggering alerts for risk management teams. For other types of data, such as fee calculations or cash postings, the system may apply rule-based validation algorithms to ensure consistency with predefined parameters and historical patterns. In cases where automated checks fail to resolve issues, the system may escalate errors to specialized teams for manual intervention, while maintaining audit trails of all error-related activities. Additionally, the system may implement fail-safe mechanisms, such as temporary trade suspensions or collateral holds, to prevent the propagation of erroneous data through the clearing process. Throughout these error handling procedures, the system may generate detailed error reports, categorizing issues by severity and data type, to facilitate efficient resolution and continuous improvement of data quality across all aspects of derivatives processing and clearing.

Resource transmission system 102 may then identify which original message or messages are associated with the reported error. Specifically, the resource transmission system 102 may determine, based on the error code, a message of the plurality of resource allocation messages associated with the error code. For example, the resource transmission system 102 may maintain a mapping between sent messages and their corresponding identifiers, use this mapping to trace back from the received error message to the original message that caused the error (e.g., based on a message identifier within the error code), and retrieve the details of that message from a local message history.

Resource transmission system 102 may identify the source of the error. Specifically, resource transmission system 102 may determine, based on the message of the plurality of resource allocation messages and the error code, that the first computing device has caused an error associated with the error code. For example, resource transmission system 102 may analyze the error code and the content of the original message, cross-reference this information with known error patterns or rules, and conclude that the error originated from the data provided by the first computing device rather than from the transformation process or the message processing system.

Resource transmission system 102 may notify the source device about the error. Specifically, resource transmission system 102 may transmit an indication of the error code to the first computing device. For example, resource transmission system 102 may generate an error notification message containing the error code and any relevant details, format this notification in a way that the first computing device can understand and send it back to the first computing device using an appropriate communication channel or protocol.

In some embodiments, resource transmission system 102 may analyze incoming messages to determine how to transform them for processing, as discussed below. FIG. 3 illustrates a transformation map data structure 300 that may be used to store information for transforming messages. Transformation map data structure 300 may include a map identifier 303, map parameters 306, and transformation data 309. Resource transmission system 102 may use map identification subsystem 114 to perform the operations below. Map identification subsystem 114 may determine the message type for each received resource allocation message. For example, map identification subsystem 114 may examine metadata or header information in the message to identify whether it is an API call, webhook notification, or other message type.

Map identification subsystem 114 may then identify the corresponding computing device that sent each message. For example, map identification subsystem 114 may extract a device identifier or IP address from the message to determine which computing device of the plurality of computing devices originated the message. Based on the identified computing device and message type, map identification subsystem 114 may determine a corresponding transformation map to use. Map identification subsystem 114 may query transformation map data structure 300 using the map identifier to retrieve a correct transformation map. Map identifier 303 may be used to uniquely identify each transformation map. Map parameters 306 may store information about the source devices and message types associated with each map. Transformation data 309 may contain the actual rules and instructions for transforming messages.

For example, if the resource transmission system 102 receives an API message from computing device 108*a*, it may look up a transformation map with parameters matching that device and API message type. The resource transmission system 102 may then retrieve the corresponding transformation data to use for converting the message format. By determining transformation maps based on both the message type and originating computing device, resource transmission system 102 may apply customized transformations for different sources and message formats. This may allow the resource transmission system 102 to handle a variety of incoming message structures and convert them to a standardized format for the message processing system 104.

Resource transmission system 102 may convert messages from their original format to a format supported by message processing system 104. Message transformation subsystem 116 may handle the actual transformation of messages using the transformation maps determined by map identification subsystem 114. Message transformation subsystem 116 may transform each message from a corresponding source encoding into a corresponding destination encoding to generate encoded messages. For example, message transformation subsystem 116 may apply a series of data transformation functions defined in each transformation map to convert the message fields from their source format to the required destination format. This may potentially involve data type conversions, field renaming, or structural reorganization.

In some embodiments, message transformation subsystem 116 may use JavaScript Object Notation (JSON) as an intermediate format when transforming messages between different encodings instead of a destination format. Message transformation subsystem 116 may first convert the source message into a JSON representation, then apply any necessary transformations to that JSON data, and finally convert the transformed JSON into the destination encoding format. This approach may provide flexibility in handling various source and destination encodings.

Message transformation subsystem 116 may support multiple source and destination encoding formats. For example, message transformation subsystem 116 may handle conversions between formats such as XML, JSON, CSV, or proprietary binary formats. The specific transformation operations may be defined in transformation data 309 of the transformation map data structure 300.

When transforming a message, message transformation subsystem 116 may first identify the source encoding based on metadata in the message or information provided by map identification subsystem 114. Message transformation subsystem 116 may then retrieve the appropriate transformation map using the map identifier 303. Message transformation subsystem 116 may apply the transformation rules specified in transformation data 309, which may include operations such as field mapping, data type conversion, or structural changes.

After transformation, message transformation subsystem 116 may validate the transformed message against a schema or set of rules for the destination encoding to ensure the output is correctly formatted. Message transformation subsystem 116 may then pass the encoded message to other components of resource transmission system 102 for further processing or transmission to the message processing system 104.

As discussed above, resource transmission system 102 may transmit the encoded messages to message processing system 104 after transforming the resource allocation messages. Communication subsystem 112 may handle the transmission of encoded messages from resource transmission system 102 to the message processing system 104. Communication subsystem 112 may establish a secure network connection with message processing system 104 to ensure data integrity and confidentiality during transmission. Furthermore, Resource transmission system 102 may package the encoded messages into a standardized transport format before sending them to message processing system 104. For example, communication subsystem 112 may encapsulate the encoded messages within a protocol such as HTTPS or a message queue protocol. Communication subsystem 112 may add appropriate headers and metadata to each message package to facilitate proper routing and processing at the receiving end.

In some embodiments, resource transmission system 102 may transmit the encoded messages in batches to optimize network usage and processing efficiency. Communication subsystem 112 may accumulate a predetermined number of encoded messages or wait for a specified time interval before initiating a batch transmission. This approach may reduce network overhead and allow for more efficient processing of messages by the message processing system 104.

In some embodiments, resource transmission system 102 may use Kafka for message transfer to the message processing system. For instance, messages may be published to a Kafka topic, which may then be consumed by the message processing system. Similarly, communication subsystem 112 may subscribe to a Kafka topic where the transformed messages are published, allowing for efficient external transmission. Communication subsystem 112 may implement retry mechanisms and error handling procedures to ensure reliable message delivery. If a transmission fails, communication subsystem 112 may attempt to resend the message according to a predefined retry policy. Communication subsystem 112 may also log transmission attempts and outcomes for auditing and troubleshooting purposes.

In some embodiments, resource transmission system 102 may use a publish-subscribe model for message transmission. Communication subsystem 112 may publish the encoded messages to specific topics or channels, and message processing system 104 may subscribe to these channels to receive the relevant messages. This approach may allow for flexible scaling and decoupling of the sending and receiving systems.

As discussed above, resource transmission system 102 may implement error handling processes to manage issues that arise during message processing. FIG. 5 illustrates an excerpt from an error table 500 that may be used to track and manage errors. Error table 500 may include an error code 503, a message identifier 506, and error data 509. Error table 500 may include other fields, as necessary.

Resource transmission system 102 may receive error messages from the message processing system 104. Specifically, resource transmission system 102 may receive, from the message processing system 104 in response to an encoded resource allocation message, an error message generated based on the encoded resource allocation message. The error message may include an error code 503. For example, communication subsystem 112 may implement an error handling callback function that receives error notifications from message processing system 104, parses the received error message to extract error code 503 and any additional error details, and logs this information in error table 500 for further analysis.

Resource transmission system 102 may then identify which original message is associated with the reported error. Specifically, resource transmission system 102 may determine, based on error code 503, a message of the plurality of resource allocation messages associated with error code 503. For example, resource transmission system 102 may maintain a mapping between sent messages and their corresponding message identifiers 506, use this mapping to trace back from the received error message to the original message that caused the error, and retrieve the details of that message from a local message history.

Resource transmission system 102 may identify the source of the error. Specifically, resource transmission system 102 may determine, based on the message of the plurality of resource allocation messages and error code 503, that first computing device 108a has caused an error associated with error code 503. For example, resource transmission system 102 may analyze error code 503 and the content of the original message, cross-reference this information with known error patterns or rules stored in error table 500, and conclude that the error originated from the data provided by first computing device 108a rather than from the transformation process or message processing system 104.

Resource transmission system 102 may notify the source device about the error. Specifically, resource transmission system 102 may transmit an indication of error code 503 to the first computing device 108a. For example, communication subsystem 112 may generate an error notification message containing error code 503 and any relevant details, format this notification in a way that first computing device 108a can understand and send it back to first computing device 108a using an appropriate communication channel or protocol.

In some embodiments, resource transmission system 102 may generate a comprehensive error package for transmission to first computing device 108a. Resource transmission system 102 may generate an error package including error code 503, type data associated with the corresponding API call or the corresponding webhook, and error data 509 received from message processing system 104. For example, map identification subsystem 114 may retrieve the relevant type data from the transformation map data structure 300 based on the map identifier 303 associated with the erroneous message. Message transformation subsystem 116 may then combine this type data with error code 503 and error data 509 to create a structured error package. Communication subsystem 112 may then transmit this error package to first computing device 108a, providing detailed information about the nature and context of the error for more effective troubleshooting and resolution.

In some embodiments, resource transmission system 102 may receive an updated resource allocation message from first computing device 108a. Message transformation subsystem 116 may transform the updated resource allocation message that fixes the error into an encoded updated resource allocation message using the first transformation map. Communication subsystem 112 may transmit the encoded updated resource allocation message to message processing system 104. Message processing system 104 may fix the error using the encoded updated resource allocation message.

In one example, a financial institution may have mistakenly allocated insufficient funds for a complex derivative trade, the initial resource allocation message may have contained incorrect cash posting information. This error could trigger a collateral shortfall, potentially impacting the trade's execution and risk management. Upon receiving an error notification from the message processing system, the resource transmission system may prompt the financial institution to review and update the allocation details. The institution may then submit an updated resource allocation message with the correct cash posting amount and adjusted collateral posting instructions to cover the trade's requirements. This updated message, once processed by the resource transmission system and forwarded to the message processing system, may resolve the initial error, ensuring proper funding and collateral allocation for the derivative trade.

Resource transmission system 102 may receive an acknowledgment from message processing system 104. This acknowledgment may indicate that the updated resource allocation message has been processed. Based on the acknowledgment and in response to the plurality of encoded messages, resource transmission system 102 may generate a resource state. The resource state may be generated using a plurality of acknowledgements received from message processing system 104.

In some embodiments, resource transmission system 102 may receive a plurality of responses from message processing system 104. These responses may be to the plurality of encoded messages. Resource transmission system 102 may aggregate the plurality of responses into a predetermined dataset. Based on aggregating the plurality of responses, resource transmission system 102 may identify a plurality of data fields within the predetermined dataset. These data fields may not have values received within the plurality of responses. Resource transmission system 102 may query message processing system 104 for the values to insert into the plurality of data fields.

Resource transmission system 102 may receive a plurality of responses from message processing system 104. These responses may be to the plurality of encoded messages. Resource transmission system 102 may aggregate the plurality of responses into a predetermined dataset. The predetermined dataset may include structured data representing the outcomes of processed resource allocation messages. Resource transmission system 102 may analyze the aggregated responses to identify a plurality of data fields within the predetermined dataset. These data fields may not have values received within the plurality of responses. The identification process may involve comparing the received data against an expected schema or template for complete resource allocation records.

In some embodiments, resource transmission system 102 may generate queries to retrieve the missing values for the identified data fields. These queries may be structured to efficiently request specific information from message processing system 104. Resource transmission system 102 may transmit these queries to message processing system 104 to obtain the values needed to complete the dataset. Upon receiving the queried values, resource transmission system 102 may update the predetermined dataset by inserting the retrieved values into their corresponding data fields. This process may ensure that the dataset contains comprehensive information about the resource allocations.

Resource transmission system 102 may then process the completed dataset to generate a resource state. The resource state may represent a snapshot of the current allocation and utilization of resources across the system. This state information may include details such as available resource quantities, allocation status, and pending transactions.

The resource state in financial trading systems may encompass crucial position information related to various financial instruments. This position information may include details about current holdings, open orders, and transaction history for financial derivatives, stocks, and bonds. For derivatives, the resource state may track information such as contract type, expiration date, strike price, and quantity held. Stock positions may be represented by the number of shares, average purchase price, and current market value. Bond positions may include face value, coupon rate, maturity date, and yield to maturity.

In some implementations, the resource state may organize position information hierarchically, with top-level categories for each asset class (e.g., derivatives, equities, fixed income) and subcategories for specific instruments or strategies. For example, within the derivatives category, there may be separate sections for futures, options, and swaps. Each position may be associated with metadata such as the account holder, trading strategy, and risk metrics. The resource state may also include aggregated views of positions across multiple accounts or portfolios, allowing for comprehensive risk management and performance analysis.

Resource transmission system 102 may update the position information within the resource state in real-time or near-real-time as new transactions are processed. When a new trade is executed, the system may adjust the relevant position data, recalculate affected metrics, and propagate the changes throughout the resource state. For instance, if a futures contract is closed out, the system may update the open interest, realized profit or loss, and available margin. Similarly, for stock trades, the system may adjust the average cost basis, total shares held, and unrealized gains or losses. This dynamic updating of the resource state may enable accurate and timely reporting, risk assessment, and decision-making for traders, portfolio managers, and compliance officers.

Resource transmission system 102 may store the generated resource state in a state table, such as state table 400 illustrated in FIG. 4. Each entry in the state table may be associated with a unique state entry identifier 403. The resource state information may be distributed across multiple parameters, such as first state parameter 406 and second state parameter 409, to capture different aspects of the resource allocation status. Resource transmission system 102 may use the generated resource state to inform subsequent resource allocation decisions. The system may analyze the current state to identify available resources, detect potential conflicts, or optimize future allocations based on historical patterns and current usage.

Resource transmission system 102 may also make the resource state available to other components of the system or external services that require up-to-date information about resource allocations. This may be achieved through a publish-subscribe mechanism, where interested parties can subscribe to receive updates whenever the resource state changes. In some implementations, resource transmission system 102 may implement a versioning system for the resource state. Each update to the state may be assigned a new version number, allowing the system to track changes over time and potentially roll back to previous states if needed. Resource transmission system 102 may periodically validate the generated resource state against the actual resource utilization reported by various components of the system. This validation process may help identify any discrepancies between the recorded state and the real-world resource allocation, ensuring the accuracy and reliability of the resource management system.

In some implementations, resource transmission system 102 may receive multiple resource allocation messages from different computing devices and in different ways. The system may receive these messages through various communication channels and protocols. For example, resource transmission system 102 may receive an application programming interface call for a first application programming interface of a plurality of application programming interfaces from computing device 108*a*. This application programming interface call may contain resource allocation information encoded in a specific format.

Upon receiving the application programming interface call, resource transmission system 102 may parse the call to extract relevant data. The system may identify the specific API being called and validate that the call meets the required parameters and structure for that API. Resource transmission system 102 may then process the extracted data to determine the resource allocation details contained within the call. After processing the API call, resource transmission system 102 may store information related to the call. The system may generate a unique identifier for the API call and associate it with the extracted resource allocation data. Resource transmission system 102 may store a first identifier of the first application programming interface in association with data associated with the application programming interface call. This association may be maintained in a data structure within the system's memory or in an external database.

The stored association between the API identifier and the call data may allow resource transmission system 102 to track and manage resource allocation requests efficiently. The system may use this information for various purposes, such as auditing, error tracking, or generating reports on resource allocation patterns. By maintaining these associations, resource transmission system 102 may also be able to correlate subsequent messages or updates with the original resource allocation request.

In addition to API calls, resource transmission system 102 may be capable of receiving resource allocation messages through other means. The system may support multiple communication protocols and message formats to accommodate various types of computing devices and systems. For instance, resource transmission system 102 may receive messages through secure file transfers, database connections, or messaging queues. Resource transmission system 102 may process each incoming resource allocation message according to its type and source. The system may apply appropriate validation and transformation rules based on the message format and the sending device. This flexible approach may allow resource transmission system 102 to integrate with a wide range of external systems and handle diverse resource allocation scenarios efficiently.

Resource transmission system 102 may also receive resource allocation messages through a webhook mechanism. In this approach, an external system or service may send HTTP POST requests to a predefined URL endpoint on resource transmission system 102 when resource allocation events occur. The webhook payload may contain structured data, such as JSON, with details about the allocated resources. Resource transmission system 102 may implement a webhook handler to process these incoming requests, validate the payload structure, extract relevant resource allocation information, and update the system's internal state accordingly. This webhook integration may allow resource transmission system 102 to receive real-time updates about resource allocations from various external sources, enabling timely processing and synchronization of resource states across different systems.

Resource transmission system 102 may receive resource allocation messages through multiple APIs and/or webhooks. The system may identify each corresponding computing device of the plurality of computing devices from which each message has been sent. Resource transmission system 102 may then determine the corresponding message type of each message of the plurality of resource allocation messages. The corresponding message types may include API messages, webhook messages, and/or other types of messages.

Resource transmission system 102 may determine a second transformation map for a first message. This determination may be based on type data associated with a corresponding webhook and the corresponding computing device. In some embodiments, the system may determine a third transformation map for a second message. This determination may be based on type data associated with a corresponding API call and the corresponding computing device. For webhook messages, resource transmission system 102 may configure one or more webhook endpoints, each designed to handle specific types of resource allocation events. The system may register these webhook endpoints with various external services or systems that generate resource allocation messages. When a webhook event occurs, the external system may send an HTTP POST request to the appropriate endpoint on resource transmission system 102.

Upon receiving a webhook message, resource transmission system 102 may first validate the authenticity of the request. This may involve checking a shared secret or cryptographic signature included in the webhook payload. The system may then parse the webhook payload, which may be in a format such as JSON or XML, to extract the relevant resource allocation information.

Resource transmission system 102 may use the webhook type and the sending system's identifier to determine the appropriate second transformation map. This map may define how to convert the webhook payload into the standardized format used by the message processing system 104. The transformation process may involve mapping fields from the webhook payload to corresponding fields in the destination format, performing data type conversions, and applying any necessary business logic.

For application programming interface messages, resource transmission system 102 may expose multiple API endpoints, each designed to handle specific types of resource allocation requests. External systems may make API calls to these endpoints to initiate resource allocation actions or provide updates. When an API call is received, resource transmission system 102 may authenticate the request using methods such as API keys or OAuth tokens. The system may then validate the API request parameters against the defined schema for that particular API endpoint. Resource transmission system 102 may use the API endpoint identifier and the calling system's credentials to determine the appropriate third transformation map. This third transformation map may define how to convert the API request parameters into the standardized format expected by message processing system 104. The transformation process for API messages may involve restructuring the request data, performing data type conversions, and applying any endpoint-specific processing logic.

By supporting both webhook and API message types, resource transmission system 102 may accommodate a wide range of integration scenarios. Webhooks may be particularly useful for event-driven updates, where external systems push resource allocation information to resource transmission system 102 as events occur. API calls may be more suitable for request-response interactions, where external systems actively query or update resource allocation information. Resource transmission system 102 may maintain separate transformation maps for webhook and API message types to account for the different structures and processing requirements of these message formats. This approach may allow the system to efficiently handle diverse resource allocation scenarios while maintaining a consistent internal representation of resource states.

Resource transmission system 102 may generate an error package in response to detecting an error associated with a resource allocation message. For example, the error package may include the error code, type data associated with the corresponding application programming interface call, and/or error data received from message processing system 104. Resource transmission system 102 may first extract the error code from the error message received from message processing system 104. This error code may be a numeric or alphanumeric identifier that uniquely represents the specific error condition encountered during processing. Resource transmission system 102 may then retrieve the type data associated with the original resource allocation message that triggered the error. For an API call, this type data may include information such as the API version, endpoint path, and method used, etc.

Resource transmission system 102 may also include any additional error data provided by message processing system 104 in the error package. This error data may contain more detailed information about the nature of the error, such as specific validation failures or processing issues encountered. After assembling the error package components, resource transmission system 102 may structure the data into a standardized format, such as JSON or XML. This structured error package may allow for consistent error handling and interpretation by the receiving system. Resource transmission system 102 may then transmit the error package to the first computing device that originally sent the problematic resource allocation message. This transmission may occur over the same communication channel used for the initial message, or through a designated error reporting interface.

By providing comprehensive error information in a structured package, resource transmission system 102 may enable the first computing device to efficiently diagnose and address issues with its resource allocation requests. This approach may facilitate faster error resolution and improve the overall reliability of the resource allocation process.

The resource transmission system 102 may include multiple interconnected components that work together to process and transmit resource allocation messages. These components may interact in various ways to achieve the overall functionality of the system.

The resource transmission system 102 may include an operations workbench component for handling operational tasks. The operations workbench may provide a centralized interface for system administrators to monitor and manage the resource transmission process. For example, the operations workbench may display real-time statistics on message processing, allow configuration of transformation rules, and provide tools for troubleshooting errors.

The resource transmission system 102 may merge trades with fees and commissions in real time using stateful stream processing. The message transformation subsystem 116 may employ Apache Flink, an open-source stream processing framework, to perform this real-time data merging. For instance, as trade messages are received by communication subsystem 112, Apache Flink may maintain the current state of each trade and dynamically merge incoming fee and commission data with the corresponding trades. This stateful processing may allow for efficient and timely updates to trade information without the need for batch processing.

Resource transmission system 102 may include a data model component that is product processor agnostic. This data model may provide a standardized representation of resource allocation data that is independent of any specific product processing system. Map identification subsystem 114 may use this data model to determine appropriate transformation maps for incoming messages, regardless of their source or destination product processor. For example, when a new message is received, map identification subsystem 114 may analyze the message structure and map it to the corresponding fields in the data model, allowing for consistent processing across different types of resource allocation messages.

Resource transmission system 102 may expose APIs using GraphQL and Apache Trino for data distribution. Communication subsystem 112 may implement these technologies to provide flexible and efficient data access to external systems. GraphQL may allow clients to request specific data fields, reducing unnecessary data transfer and improving query efficiency. Apache Trino, a distributed SQL query engine, may enable resource transmission system 102 to execute complex queries across multiple data sources. For instance, an external system may use a GraphQL API to request specific trade details, which resource transmission system 102 may then retrieve and aggregate using Apache Trino from various internal data stores. In some implementations, resource transmission system 102 may use Representational State Transfer (REST), Oracle Relational Database Management System (RDBMS), and/or other technologies for flexible and efficient data access to external systems.

Resource transmission system 102 may use Apache Flink for stateful stream processing to compute real-time positions from trade data. As trade messages are processed by the message transformation subsystem 116, Apache Flink may maintain the current state of positions for each account or instrument. When a new trade is received, Apache Flink may update the relevant positions in real-time, allowing for immediate reflection of the latest trading activity. This real-time position computation may enable resource transmission system 102 to provide up-to-date information to downstream systems and users without delay.

Figure 6:
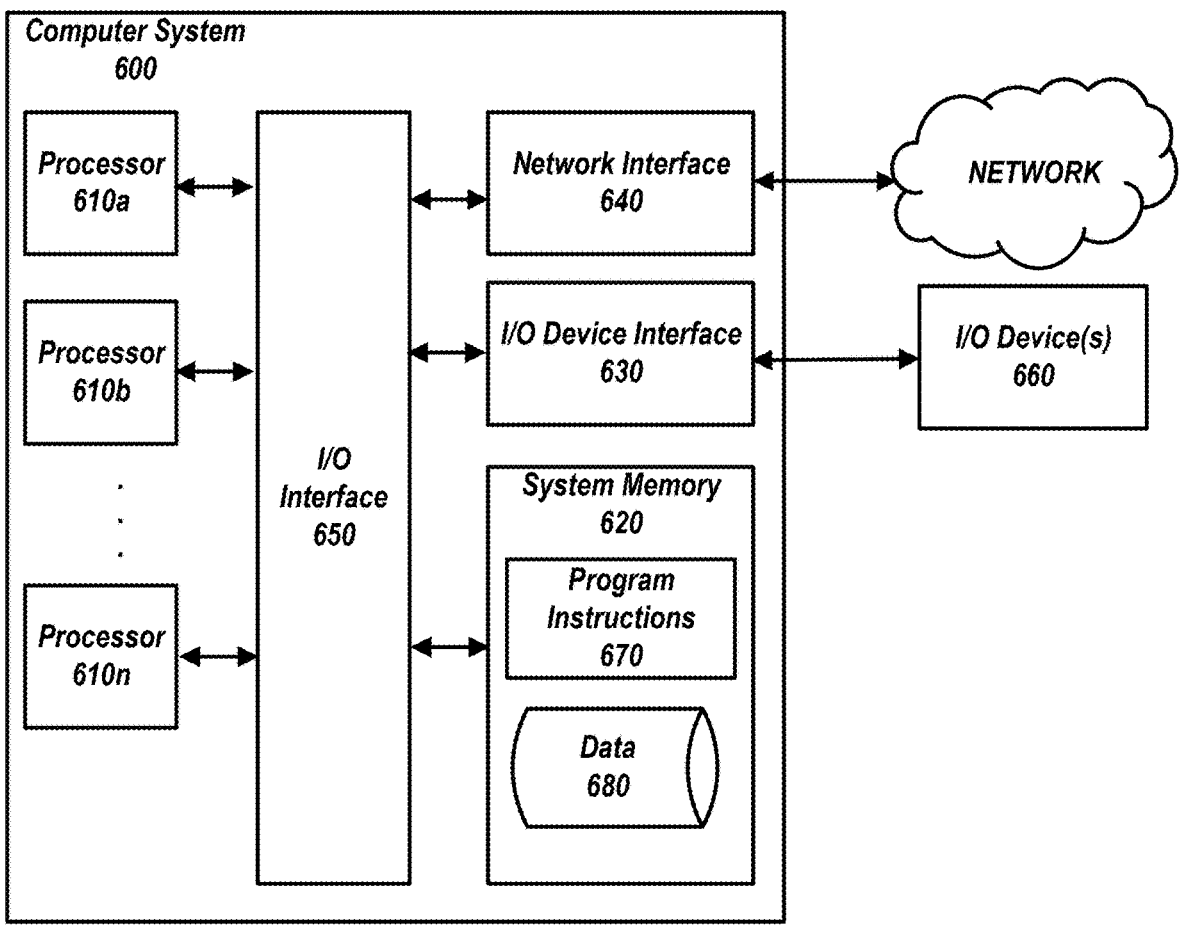
FIG. 6 illustrates a computing device, in accordance with example embodiments.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n* include 610*b*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
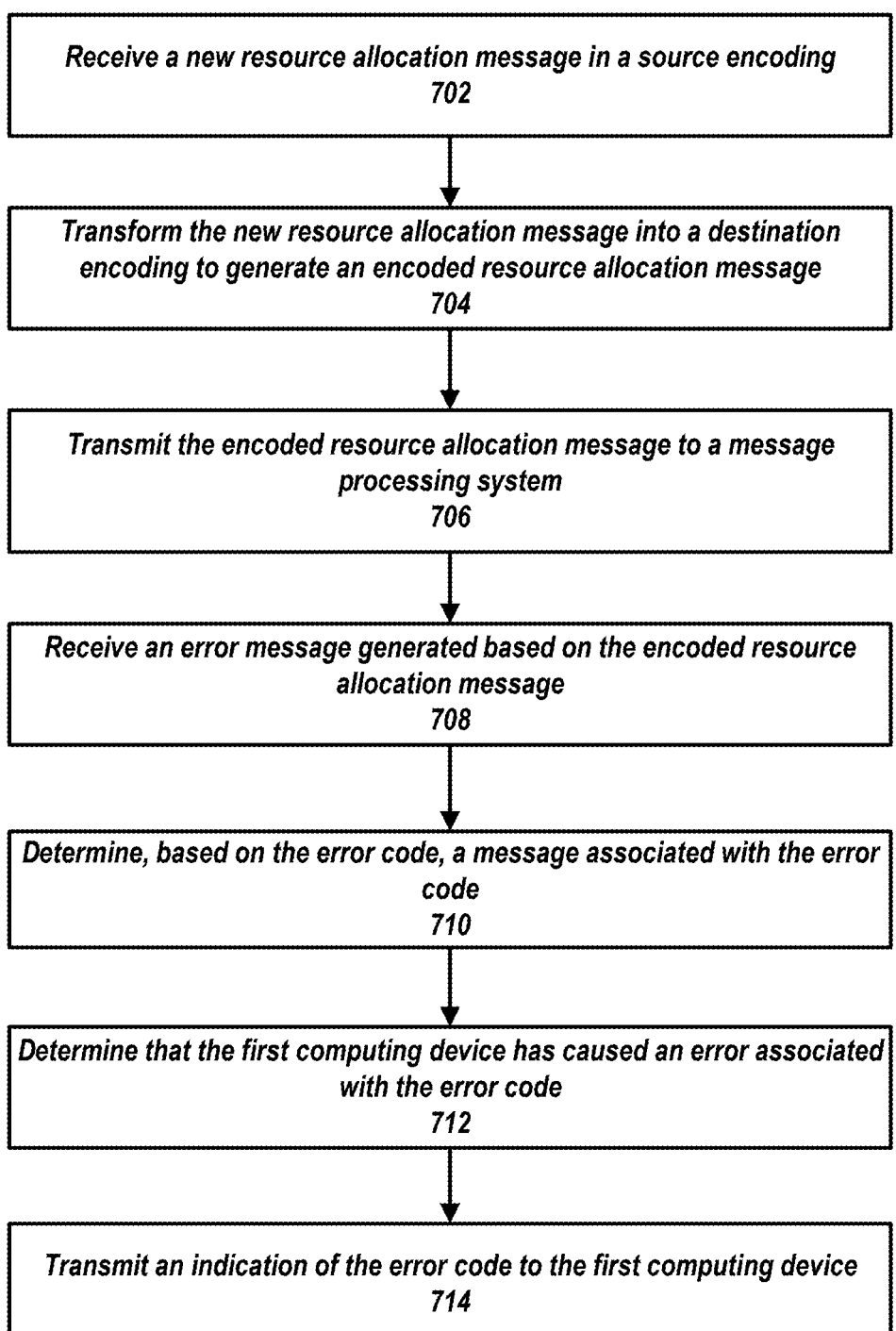
FIG. 7 illustrates a flowchart of operations for transmitting transformed resources, in accordance with some embodiments of this disclosure.

FIG. 7 illustrates a flowchart of process 700 performed by resource transmission system 102, focusing on the operations for handling resource allocation messages. At 702, resource transmission system 102 receives a new resource allocation message in a source encoding. This operation involves network interface 640 of computing system 600, as shown in FIG. 6, which facilitates the receipt of external data from computing devices 108a-108n. At 704, resource transmission system 102 transforms the new resource allocation message into a destination encoding to generate an encoded resource allocation message. This transformation is executed by processors 610a-610n (FIG. 6) using program instructions 670 stored in system memory 620, which may include the transformation maps and logic for message conversion.

At 706, resource transmission system 102 transmits the encoded resource allocation message to a message processing system. This transmission is facilitated by network interface 640 (FIG. 6), sending the encoded message over a network to the message processing system 104. At 708, resource transmission system 102 receives an error message that was generated based on the encoded resource allocation message. This error message is received through network interface 640 (FIG. 6) and may be initially processed by I/O interface 650 before being passed to processors 610a-610n for further handling.

At 710, resource transmission system 102 determines, based on the error code, a message associated with the error code. This determination is performed by processors 610a-610n (FIG. 6) using program instructions 670, which may include error handling logic and access to stored message data in system memory 620. At 712, resource transmission system 102 determines that the first computing device has caused an error associated with the error code. This analysis is carried out by processors 610a-610n (FIG. 6), potentially utilizing data stored in system memory 620 to correlate error codes with specific computing devices. At 714, resource transmission system 102 transmits an indication of the error code to the first computing device. This transmission is executed using network interface 640 (FIG. 6), sending the error indication back to the originating computing device over the network.

The following examples pertain to further embodiments.

1. A method comprising: receiving, from a first computing device of a plurality of computing devices, a new resource allocation message in a source encoding of a plurality of source encodings; transforming, using a first transformation map of a plurality of transformation maps, the new resource allocation message into a destination encoding of a plurality of destination encodings to generate an encoded resource allocation message; transmitting the encoded resource allocation message to a message processing system; receiving, from the message processing system in response to the encoded resource allocation message, an error message generated based on the encoded resource allocation message, wherein the error message comprises an error code; determining, based on the error code, a message of a plurality of resource allocation messages associated with the error code, wherein messages within the plurality of resource allocation messages were previously received, transformed using corresponding transformation maps of the plurality of transformation maps, and transmitted to the message processing system; determining, based on the message of the plurality of resource allocation messages and the error code, that the first computing device has caused an error associated with the error code; and transmitting an indication of the error code to the first computing device.

2. The method of claim 1, further comprising: receiving the plurality of resource allocation messages from the plurality of computing devices, wherein each resource allocation message of the plurality of resource allocation messages comprises a corresponding plurality of parameters associated with a corresponding set of resources; determining, based on a corresponding computing device of the plurality of computing devices and a corresponding message type of each message of the plurality of resource allocation messages retrieved from the corresponding plurality of parameters, a corresponding transformation map of the plurality of transformation maps for transforming each message of the plurality of resource allocation messages; transforming, using the plurality of transformation maps, each message from a corresponding source encoding of the plurality of source encodings into a corresponding destination encoding of the plurality of destination encodings to generate a plurality of encoded messages; and transmitting the plurality of encoded messages to the message processing system, wherein the message processing system processes the plurality of encoded messages to generate a plurality of records.

3. The method of any of the preceding embodiments, further comprising: receiving from the first computing device an updated resource allocation message; transforming, using the first transformation map, the updated resource allocation message that fixes the error into encoded updated resource allocation message; and transmitting the encoded updated resource allocation message to the message processing system, wherein the message processing system fixes the error using the encoded updated resource allocation message.

4. The method of any of the preceding embodiments, further comprising: receiving, from the message processing system, an acknowledgment indicating that the updated resource allocation message has been processed; and based on the acknowledgment and in response to the plurality of encoded messages, generating a resource state using a plurality of acknowledgements received from the message processing system.

5. The method of any of the preceding embodiments, further comprising: receiving, from the message processing system, a plurality of responses to the plurality of encoded messages; aggregating the plurality of responses into a predetermined dataset; identifying, based on aggregating the plurality of responses, a plurality of data fields within the predetermined dataset that do not have values received within the plurality of responses; and querying, the message processing system, for the values to insert into the plurality of data fields.

6. The method of any of the preceding embodiments, wherein determining the corresponding transformation map of the plurality of transformation maps for transforming each message of the plurality of resource allocation messages further comprises: identifying each corresponding computing device of the plurality of computing devices from which each message has been sent; determining the corresponding message type of each message of the plurality of resource allocation messages, wherein corresponding message types comprise an application programming interface message and a webhook message; determining, a second transformation map for a first message, based on type data associated with a corresponding webhook and the corresponding computing device; and determining, a third transformation map for a second message, based on the type data associated with a corresponding application programming interface call and the corresponding computing device.

7. The method of any of the preceding embodiments, wherein receiving the plurality of resource allocation messages from the plurality of computing devices further comprises: receiving, from a second computing device of the plurality of computing devices, an application programming interface call for a first application programming interface of a plurality of application programming interfaces; and storing a first identifier of the first application programming interface in association with data associated with the application programming interface call.

8. The method of any of the preceding embodiments, wherein transmitting the indication of the error code to the first computing device further comprises: generating an error package comprising the error code, type data associated with each corresponding application programming interface call or each corresponding webhook, and error data received from the message processing system; and transmitting the error package to the first computing device.

9. One or more tangible, non-transitory, computer-readable media storing instructions that, when executed by a data processing apparatus, cause the data processing apparatus to perform operations comprising those of any of embodiments 1-8.

10. A system comprising: one or more processors; and memory storing instructions that, when executed by the one or more processors, cause the processors to effectuate operations comprising those of any of embodiments 1-8.

11. A system comprising means for performing any of embodiments 1-8.

12. A system comprising cloud-based circuitry for performing any of embodiments 1-8.

The invention claimed is:

1. A system for performing cloud-based resource transmission, the system comprising:

one or more processors; and one or more memories configured to store instructions that when executed by the one or more processors perform operations comprising:

receiving a plurality of resource allocation messages from a plurality of computing devices, wherein each resource allocation message of the plurality of resource allocation messages comprises a corresponding plurality of parameters associated with a corresponding set of resources;

determining, based on a corresponding computing device of the plurality of computing devices and on a corresponding message type of each message of the plurality of resource allocation messages retrieved from the corresponding plurality of parameters, a corresponding transformation map of a plurality of transformation maps for transforming each message of the plurality of resource allocation messages;

transforming, using one or more of the plurality of transformation maps, each message from a corresponding source encoding of a plurality of source encodings into a corresponding destination encoding of a plurality of destination encodings to generate a plurality of encoded messages;

transmitting the plurality of encoded messages to a message processing system, wherein the message processing system processes the plurality of encoded messages to generate a plurality of records;

subsequently to transmitting the plurality of encoded messages, receiving, from a first computing device of the plurality of computing devices, a new resource allocation message in a source encoding of the plurality of source encodings;

transforming, using a first transformation map of the plurality of transformation maps, the new resource allocation message into a destination encoding of the plurality of destination encodings to generate an encoded resource allocation message;

transmitting the encoded resource allocation message to the message processing system;

receiving, from the message processing system and in response to the encoded resource allocation message, an error message generated based on the encoded resource allocation message, wherein the error message comprises an error code;

determining, based on the error code, a message of the plurality of resource allocation messages associated with the error code;

determining, based on the message of the plurality of resource allocation messages and the error code, that the first computing device has caused an error associated with the error code; and transmitting an indication of the error code to the first computing device.

2. The system of claim 1, wherein the instructions further cause the one or more processors to perform operations comprising:

receiving from the first computing device an updated resource allocation message;

transforming, using the first transformation map, the updated resource allocation message that fixes the error into encoded updated resource allocation message; and transmitting the encoded updated resource allocation message to the message processing system, wherein the message processing system fixes the error using the encoded updated resource allocation message.

3. The system of claim 2, wherein the instructions further cause the one or more processors to perform operations comprising:

receiving, from the message processing system, an acknowledgment indicating that the updated resource allocation message has been processed; and based on the acknowledgment and in response to the plurality of encoded messages, generating a resource state using a plurality of acknowledgements received from the message processing system.

4. The system of claim 3, wherein the instructions further cause the one or more processors to perform operations comprising:

receiving, from the message processing system, a plurality of responses to the plurality of encoded messages;

aggregating the plurality of responses into a predetermined dataset;

identifying, based on aggregating the plurality of responses, a plurality of data fields within the predetermined dataset that do not have values received within the plurality of responses; and querying, the message processing system, for the values to insert into the plurality of data fields.

5. The system of claim 1, wherein the instructions for receiving the plurality of resource allocation messages from the plurality of computing devices, further cause the one or more processors to perform operations comprising:

receiving, from a second computing device of the plurality of computing devices, an application programming interface call for a first application programming interface of a plurality of application programming interfaces; and storing a first identifier of the first application programming interface in association with data associated with the application programming interface call.

6. The system of claim 1, wherein the instructions for determining the corresponding transformation map of the plurality of transformation maps for transforming each message of the plurality of resource allocation messages further cause the one or more processors to perform operations comprising:

identifying each corresponding computing device of the plurality of computing devices from which each message has been sent;

determining the corresponding message type of each message of the plurality of resource allocation messages, wherein corresponding message types comprise an application programming interface message and a webhook message;

determining, a second transformation map for a first message, based on type data associated with a corresponding webhook and the corresponding computing device; and determining, a third transformation map for a second message, based on the type data associated with a corresponding application programming interface call and the corresponding computing device.

7. The system of claim 6, wherein the instructions for transmitting the indication of the error code to the first computing device further cause the one or more processors to perform operations comprising:

generating an error package comprising the error code, the type data associated with the corresponding application programming interface call or the corresponding webhook, and error data received from the message processing system; and transmitting the error package to the first computing device.

8. A method for performing cloud-based resource transmission, the method comprising:

receiving, from a first computing device of a plurality of computing devices, a new resource allocation message in a source encoding of a plurality of source encodings;

transforming, using a first transformation map of a plurality of transformation maps, the new resource allocation message into a destination encoding of a plurality of destination encodings to generate an encoded resource allocation message;

transmitting the encoded resource allocation message to a message processing system;

receiving, from the message processing system in response to the encoded resource allocation message, an error message generated based on the encoded resource allocation message, wherein the error message comprises an error code;

determining, based on the error code, a message of a plurality of resource allocation messages associated with the error code, wherein messages within the plurality of resource allocation messages were previously received, transformed using corresponding transformation maps of the plurality of transformation maps, and transmitted to the message processing system;

determining, based on the message of the plurality of resource allocation messages and the error code, that the first computing device has caused an error associated with the error code; and transmitting an indication of the error code to the first computing device.

9. The method of claim 8, further comprising:

receiving the plurality of resource allocation messages from the plurality of computing devices, wherein each resource allocation message of the plurality of resource allocation messages comprises a corresponding plurality of parameters associated with a corresponding set of resources;

determining, based on a corresponding computing device of the plurality of computing devices and a corresponding message type of each message of the plurality of resource allocation messages retrieved from the corresponding plurality of parameters, a corresponding transformation map of the plurality of transformation maps for transforming each message of the plurality of resource allocation messages;

transforming, using the plurality of transformation maps, each message from a corresponding source encoding of the plurality of source encodings into a corresponding destination encoding of the plurality of destination encodings to generate a plurality of encoded messages; and transmitting the plurality of encoded messages to the message processing system, wherein the message processing system processes the plurality of encoded messages to generate a plurality of records.

10. The method of claim 9, further comprising:

receiving from the first computing device an updated resource allocation message;

transforming, using the first transformation map, the updated resource allocation message that fixes the error into encoded updated resource allocation message; and transmitting the encoded updated resource allocation message to the message processing system, wherein the message processing system fixes the error using the encoded updated resource allocation message.

11. The method of claim 10, further comprising:

receiving, from the message processing system, an acknowledgment indicating that the updated resource allocation message has been processed; and based on the acknowledgment and in response to the plurality of encoded messages, generating a resource state using a plurality of acknowledgements received from the message processing system.

12. The method of claim 11, further comprising:

receiving, from the message processing system, a plurality of responses to the plurality of encoded messages;

aggregating the plurality of responses into a predetermined dataset;

identifying, based on aggregating the plurality of responses, a plurality of data fields within the predetermined dataset that do not have values received within the plurality of responses; and querying, the message processing system, for the values to insert into the plurality of data fields.

13. The method of claim 9, wherein determining the corresponding transformation map of the plurality of transformation maps for transforming each message of the plurality of resource allocation messages further comprises:

identifying each corresponding computing device of the plurality of computing devices from which each message has been sent;

determining the corresponding message type of each message of the plurality of resource allocation messages, wherein corresponding message types comprise an application programming interface message and a webhook message;

determining, a second transformation map for a first message, based on type data associated with a corresponding webhook and the corresponding computing device; and determining, a third transformation map for a second message, based on the type data associated with a corresponding application programming interface call and the corresponding computing device.

14. The method of claim 8, wherein receiving the plurality of resource allocation messages from the plurality of computing devices further comprises:

receiving, from a second computing device of the plurality of computing devices, an application programming interface call for a first application programming interface of a plurality of application programming interfaces; and storing a first identifier of the first application programming interface in association with data associated with the application programming interface call.

15. The method of claim 14, wherein transmitting the indication of the error code to the first computing device further comprises:

generating an error package comprising the error code, type data associated with each corresponding application programming interface call or each corresponding webhook, and error data received from the message processing system; and transmitting the error package to the first computing device.

16. One or more non-transitory, computer-readable media storing instructions thereon, wherein the instructions cause one or more processors to perform operations comprising:

receiving, from a first computing device of a plurality of computing devices, a new resource allocation message in a source encoding of a plurality of source encodings;

transforming, using a first transformation map of a plurality of transformation maps, the new resource allocation message into a destination encoding of a plurality of destination encodings to generate an encoded resource allocation message;

transmitting the encoded resource allocation message to a message processing system;

receiving, from the message processing system in response to the encoded resource allocation message, an error message generated based on the encoded resource allocation message, wherein the error message comprises an error code;

determining, based on the error code, a message of a plurality of resource allocation messages associated with the error code, wherein messages within the plurality of resource allocation messages were previously received, transformed using corresponding transformation maps of the plurality of transformation maps, and transmitted to the message processing system;

determining, based on the message of the plurality of resource allocation messages and the error code, that the first computing device has caused an error associated with the error code; and transmitting an indication of the error code to the first computing device.

17. The one or more non-transitory, computer-readable media of claim 16, wherein the instructions further cause the one or more processors to perform operations comprising:

receiving the plurality of resource allocation messages from the plurality of computing devices, wherein each resource allocation message of the plurality of resource allocation messages comprises a corresponding plurality of parameters associated with a corresponding set of resources;

determining, based on a corresponding computing device of the plurality of computing devices and a corresponding message type of each message of the plurality of resource allocation messages retrieved from the corresponding plurality of parameters, a corresponding transformation map of the plurality of transformation maps for transforming each message of the plurality of resource allocation messages;

transforming, using the plurality of transformation maps, each message from a corresponding source encoding of the plurality of source encodings into a corresponding destination encoding of the plurality of destination encodings to generate a plurality of encoded messages; and transmitting the plurality of encoded messages to the message processing system, wherein the message processing system processes the plurality of encoded messages to generate a plurality of records.

18. The one or more non-transitory, computer-readable media of claim 17, wherein the instructions further cause the one or more processors to perform operations comprising:

receiving from the first computing device an updated resource allocation message;

transforming, using the first transformation map, the updated resource allocation message that fixes the error into encoded updated resource allocation message; and transmitting the encoded updated resource allocation message to the message processing system, wherein the message processing system fixes the error using the encoded updated resource allocation message.

19. The one or more non-transitory, computer-readable media of claim 18, wherein the instructions further cause the one or more processors to perform operations comprising:

receiving, from the message processing system, an acknowledgment indicating that the updated resource allocation message has been processed; and based on the acknowledgment and in response to the plurality of encoded messages, generating a resource state using a plurality of acknowledgements received from the message processing system.

20. The one or more non-transitory, computer-readable media of claim 19, wherein the instructions further cause the one or more processors to perform operations comprising:

receiving, from the message processing system, a plurality of responses to the plurality of encoded messages;

aggregating the plurality of responses into a predetermined dataset;

identifying, based on aggregating the plurality of responses, a plurality of data fields within the predetermined dataset that do not have values received within the plurality of responses; and querying, the message processing system, for the values to insert into the plurality of data fields.

* * * * *